United States Patent Office 3,099,172
Patented July 30, 1963

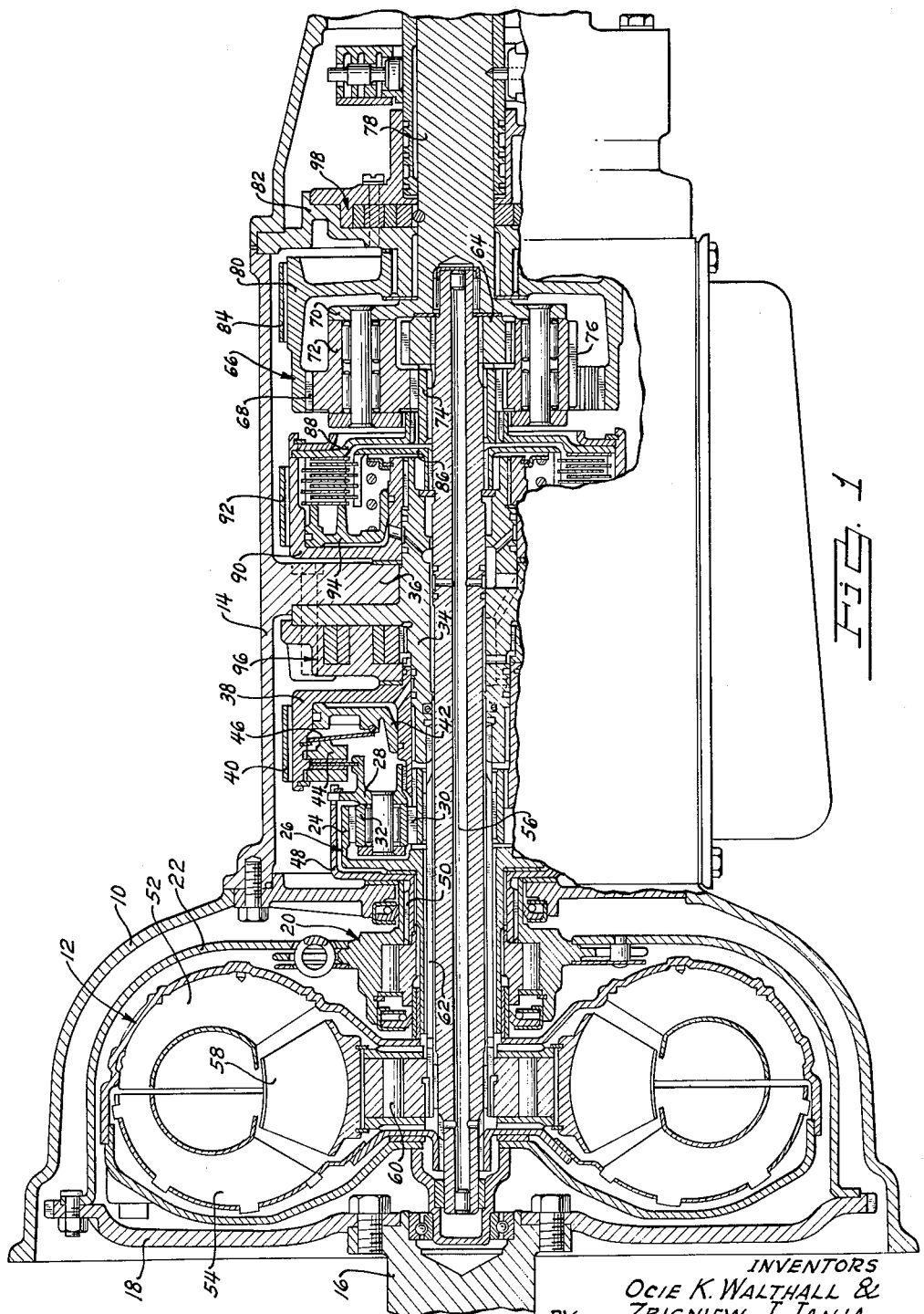

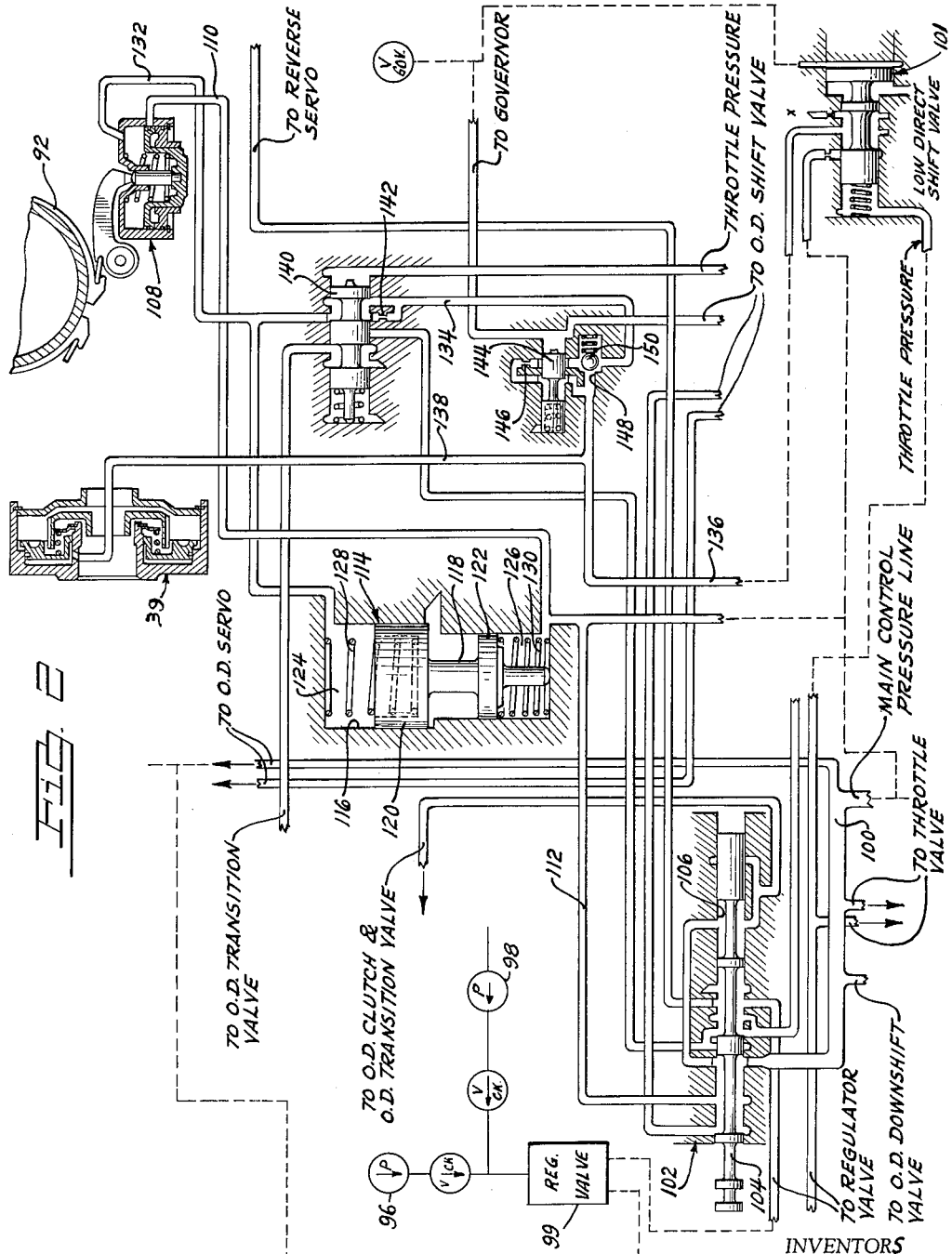

1

3,099,172
AUTOMATIC TRANSMISSION CONTROL CIRCUIT
Zbigniew J. Jania, Detroit, and Ocie K. Walthall, Dearborn, Mich., assignors to Ford Motor Company, Dearborn, Mich., a corporation of Delaware
Filed Feb. 11, 1957, Ser. No. 639,329
15 Claims. (Cl. 74—751)

Our invention relates generally to an automatic control mechanism and more particularly to a new and improved control valve circuit for an automatic, multiple speed, power transmission mechanism. Our invention is particularly adapted to be used with automotive vehicle transmission mechanisms employing compounded planetary gear elements capable of delivering power from a driving shaft to a driven shaft with a plurality of relative speed ratios. Clutch and brake means may be provided for selectively braking or clutching together the various elements of the planetary gear train to obtain a desired sequence of shifts between the various ratios. During a given shift sequence it is usually necessary to de-energize one brake or clutch element while simultaneously energizing another in timed relationship, and this requires a proper degree of overlap between the operation of the two control elements involved in order to maintain a smooth transition from one speed reduction ratio to the next. The degree of overlap which is desirable depends upon the degree of influence of certain operating parameters which exists at the instant the shift is initiated, typical parameters being vehicle speed and engine torque.

Certain transmission control circuits of conventional design make provision for delaying the application of one gear control element by including an accumulator chamber in parallel relationship with respect to the working chamber of a fluid operated servo associated with the control element to be actuated thereby providing a cushioned engagement of the gear control member. However, the effectiveness of such a conventional accumulator is somewhat less than the optimum as the operating parameters vary from those pre-selected values for which the accumulator and servo arrangement is designed. As a result, a smooth shift sequence may be obtained under certain driving conditions but the same degree of smoothness will not be obtained under other driving conditions.

In the control circuit embodying the improvement of our instant invention, the various clutch and brake control elements are actuated by fluid pressure operated servos and the fluid circuit of which the servos form a part are supplied with pressurized fluid by an engine-driven pump and by a tail shaft driven pump. A regulator valve assembly is provided in the circuit for varying the control pressure level as required by the torque demands. According to a principal feature of our invention, we have provided an improved accumulator and servo arrangement and have made the same sensitive to such variations in the control pressure level to provide an optimum degree of overlap and proper timing regardless of the torque demands.

The provision of an improved transmission control circuit of the type above described being a principal object of our invention, it is a further object to provide a fluid operated clutch or brake and accumulator arrangement for an automatic vehicle transmission which is capable of effecting a timed clutch or brake engagement with a maximum degree of smoothness under all driving conditions.

It is a further object of our invention to provide an improved control circuit of the type above set forth which is characterized by a simplified construction.

It is a further object of our invention to provide in combination an accumulator and a pair of fluid pressure operated servos capable of functioning in timed relationship, the engagement time and degree of overlap being automatically controlled within pre-selected limits.

For the purpose of particularly describing a preferred embodiment of our invention, reference will be made to the accompanying drawings wherein:

FIGURE 1 is a cross sectional assembly view of a multiple speed power transmission mechanism having planetary gear elements adapted to be controlled by the improved control circuit of our instant invention; and FIGURE 2 is a schematic representation of a portion of the control valve circuit for the transmission of FIGURE 1 including the improvement of our invention.

For the purpose of briefly describing the operating environment for the improved control circuit of our invention reference will first be made to the transmission mechanism of FIGURE 1. Numeral 10 is used to designate a cast enclosure for a hydrokinetic torque converter generally designated by numeral 12. The planetary gear reduction elements are enclosed by another cast enclosure 14, the two enclosures 10 and 14 forming a unitary transmission housing.

A portion of an engine crankshaft is shown at 16 and it is connected to a drive plate 18 which in turn is connected to the outer race of a one-way clutch assembly 20 by means of a drive member 22. The inner race of clutch 20 is connected to the ring gear 24 of an overdrive planetary unit 26, said planetary unit including a carrier 28 and a sun gear 30, the carrier 28 carrying a plurality of planet gears 32 drivably engaged with the ring gear 24 and sun gear 30. A sleeve or extension 34 is secured to a transverse wall 36 forming a part of the converter housing and is adapted to rotatably journal a drum shaped control member 38. The sun gear 30 is positively splined to the control member 38 and a brake band 40 encircles the member 38 for the purpose of braking the same and for braking the sun gear 30. A fluid operated clutch means is provided for clutching carrier 28 to the sun gear 30 and it includes a fluid pressure operated piston 42 capable of actuating a friction clutch disc plate 44, an annular spring disc 46 being provided for this purpose.

The outer race of the one-way clutch 20 is positively connected to the carrier 28 by means of a drive member 48, a suitable spline connection being shown at 50. The ring gear 24 is positively connected to the inner race of the one-way clutch 20 and to the hub of a pump member 52 of the hydrokinetic torque converter 12. The pump member 52 is in operative association with respect to a turbine member 54 which may be centrally splined to a power shaft 56 extending axially through the transmission in concentric relationship with respect to the overdrive planetary unit 26. A reactor member 58 is interposed between the exit side of the turbine member 54 and the entrance of pump member 52 and is rotatably mounted on a one-way clutch 60 in conventional fashion. The inner race of the one-way clutch 60 is fixed to a stationary sleeve shaft 62 which may be positively splined at one end thereof to the extension 34.

The power shaft 56 is connected to a first sun gear 64 of a rear compound planetary unit 66, with unit 66 further including a ring gear 68, a planet carrier 70, planet pinions 72 rotatably carried in carrier 70 and a second sun gear 74. The planet carrier 70 further carries planet pinions 76 which are adapted to drivably engage the sun gear 64. The planet pinions 72 and 76 are in driving engagement with each other and the former is also in driving engagement with the sun gear 74 and the aforementioned ring gear 68. The carrier 70 is connected to the power output tail shaft 78. The brake drum 80 is rotatably journaled on a stationary end wall 82 of the transmission housing and a brake band 84 encircles the same.

A clutch member 86 is positively splined to the power shaft 56 and another clutch member 88 is positively connected to sun gear 74. The clutch members 86 and 88 carry clutch discs capable of clutching together the sun gears 64 and 74. The multiple disc clutch assembly includes a drum 90 rotatably journaled on extension 34 of the transmission housing and a brake band 92 encircles the same, said brake band 92 being capable of selectively braking the sun gear 74. The drum member 90 defines an annular cylinder within which is slidably positioned a piston 94 for energizing the multiple friction disc assembly.

The control circuit, subsequently to be described with reference to FIGURE 2, includes two positive displacement gear pumps which are generally designated in FIG. 1 by numerals 96 and 98, the former being secured to and partly defined by the wall 36 and extension 34, and the latter being secured to and partly defined by the end wall 82. The driving gear member of pump 96 is drivably connected to member 38.

During operation of the transmission structure shown in FIGURE 1, a first gear reduction may be obtained by energizing the brake band 92 thereby anchoring the sun gear 74. The front clutch shown at 42, 44 and 46 is energized during forward drive operation although it does not form a portion of the power delivery path. The front clutch thus serves to lock the elements of the front planetary unit 26 together to permit engine braking and to prevent the sun gear 30 from overspeeding when the driving torque is temporarily interrupted. During overdrive operation, a driving torque is transmitted from the engine crankshaft 16 to the outer race of the one-way clutch 20. Since the sun gear 30 of the planetary unit 26 is not braked, the ring gear 24 will not be overspeeded and the driving torque will then be delivered directly through the overrunning clutch 20 to the hub of the pump member or impeller 52 thereby establishing fluid circulation in the torus circuit defined by the pump, turbine and reactor shrouds. The resulting turbine torque is delivered through the power shaft 56 to the sun gear 64 and the rear planetary unit 66 thereby driving the planet pinion 76 which in turn causes pinions 72 to ride about the stationary sun gear 74 to drive the carrier 70 and power output tail shaft 78 at a relatively reduced speed. To obtain direct drive, the rear multiple disc clutch is energized thereby locking together the sun gears 74 and 64 to effect a one to one driving ratio between the power shaft 56 and the power output tail shaft 78. The total torque multiplication obtained in the transmission mechanism is only that which is contributed by the torque converter 12.

The front clutch remains energized during second speed or direct drive operation although it does not form a portion of the power delivery path, as previously pointed out.

To obtain overdrive or third speed operation, the rear multiple disc clutch assembly remains energized and the front brake band 40 is energized while the front clutch is released. Since the front sun gear 30 is thus held stationary, the ring gear 24 will be overspeeded with respect to the carrier 28 and with respect to the outer race of the one-way clutch 20. The inner race of the one-way clutch 20 will thus be caused to overspeed the outer race since it is positively connected to the ring gear 24, said one-way clutch 20 being adapted to accommodate this overspeeding. It is thus apparent that the pump or impeller member 52 will be overspeeded with respect to the crankshaft 16 and that the overall driving ratio will be equal to the overdrive ratio obtained in the front planetary gear unit 26, the overall torque multiplication being equal to the torque multiplication obtained in the hydrokinetic torque converter 12 multiplied by the overdrive ratio.

To obtain reverse drive, the brake band 84 may be energized thus braking the ring gear 68 of the rear planetary unit 66. Brake bands 40 and 92 and the rear multiple disc clutch are de-energized but the front clutch is energized as in first gear and direct drive operation. The one-way clutch 20 thus forms part of the power delivery path during reverse drive operation. Torque is delivered to the power delivery shaft 56 and to the sun gear 64 thereby driving the intermeshed planetary pinions 72 and 76. Since the ring gear is held stationary, the pinions 72 are driven in reverse thus turning the carrier 70 and the power output tail shaft 78 at a reduced speed ratio.

By preference, the low gear reduction ratio obtained in the transmission assembly of FIGURE 1 is 1.82:1, the high gear ratio is 1:1, the overdrive ratio is .7:1 and the reverse ratio is 1.82:1.

The control circuit for sequentially energizing the clutch and brake elements of FIGURE 1 is schematically illustrated in part in FIGURE 2. Reference may be made to U.S. Patent No. 2,987,942 for the purpose of supplementing this disclosure. This patent is assigned to the assignee of the instant invention. The control circuit is supplied with fluid pressure by the aforementioned front pump 96 and the rear pump 98, the discharge sides of the pumps communicating with a main pressure regulator valve 99 which is capable of maintaining a regulated pressure level in the control circuit. Suitable conduit structure is provided for interconnecting the regulator valve with the various clutch and brake control elements of the transmission, said conduit structure being defined in part by a low-direct shift valve 101 and an overdrive shift valve, not shown. During low speed operation regulated control pressure is directly applied to a low speed servo for energizing the low-speed brake band 92. Regulated control pressure is also directed through other portions of the control circuit to the front clutch to maintain the same in an energized condition. A throttle valve is included within the circuit for producing a modulated control pressure or throttle pressure which is proportional in magnitude to the engine throttle setting, a suitable mechanical linkage being provided between the engine throttle and the throttle valve for actuating the latter. This throttle pressure is directed to the regulator valve mechanism thereby making the latter sensitive to variations in engine torque which in turn are a function of the engine throttle setting. The regulator valve mechanism is thus effective to adjust the magnitude of the control pressure so that the latter is substantially proportional to the torque demands.

The low-direct shift valve and the overdrive-direct shift valve are each subjected to throttle pressure for urging the same in one direction in opposition to a vehicle speed governor pressure which acts on the shift valves in the opposite direction. The net actuating force for the shift valves is thus equal to the force differential produced by the opposed throttle and governor pressures. Such a shift valve is shown in the aforementioned Patent No. 2,987,942.

The governor pressure is supplied by a tail shaft driven governor mechanism which is capable of modulating line pressure to produce a resulting governor pressure that is proportional in magnitude to the power output tail shaft speed.

As the vehicle accelerates in first gear, the magnitude of the governor pressure increases and at some predetermined shift point, which is dependent upon the engine throttle setting, the low-direct shift valve assumes an upshift position thereby providing an uninterrupted fluid pressure path between the line pressure passage on the output side of the pressure regulator mechanism and the release side of the low speed servo, thereby denergizing the latter. The low-direct shift valve is also capable of simultaneously supplying line pressure to that portion of the conduit structure leading to the direct drive rear clutch. It is thus seen that the shifting movement of the low-direct shift valve initiates a simultaneous engagement of the rear clutch and a disengagement of the low speed servo. Since such a shift from low speed to direct drive must be accompanied by an appropirate change in engine speed, it is necessary for the direct drive clutch to be cushioned or gradually applied. Also since the torque transmitting capacity of the direct drive clutch is gradually increased in this fashion, the torque reaction on the low speed brake band is proportionately decreased. It is thus necessary for the low speed servo to accommodate such a gradual disengagement of the low speed brake band. These two inter-related functions are accomplished by providing an improved accumulator mechanism in the circuit to effect a uniform rate of increase in the effective line pressure made available to the direct drive clutch and the correspondingly uniform rate of decrease in the brake capacity of the low speed servo.

During a downshift from direct drive into low speed operation, the vehicle engine must be accelerated and a delayed operation of the low speed servo is desirable for this reason. This necessarily requires a simultaneous and progressive decrease in the clutching capacity of the direct drive clutch. Accordingly, as the low direct shift valve is moved into the downshift position, the apply side of the low speed servo and the direct drive clutch servo are supplied with pressurized fluid through the low direct shift valve. The accumulator mechanism above-mentioned is effective during such a downshift to accomplish such a gradual decrease in the direct drive clutch actuating pressure and a corresponding increase in the braking capacity of the low speed servo. Since the torque reaction requirements of the low speed brake band and the torque transmitting capacity of the direct drive clutch are dependent upon the magnitude of the control pressure, the time necessary to effect a smooth transition from low speed operation to direct or vice versa will bs substantially reduced. The above-mentioned accumulator mechanism is capable of automatically regulating the shift transition period.

Referring next to FIGURE 2 for a more complete description of the arrangement of the accumulator mechanism with the low speed servo and the direct drive clutch control, pressure is supplied by the main regulator valve 99 to line 100 through which it is transferred to a manually operated selector valve 102 which includes a movable valve element 104 slidably positioned within a corresponding cooperating valve chamber 106. The low speed servo mechanism is generally designated by numeral 108 and the apply side thereof is connected to the manual valve chamber 106 by means of passages 110 and 112. Passage 112 is supplied with fluid pressure by the control pressure line 100 through the manual valve chamber 106, the adjacent valve lands on the valve spool 104 permitting free communication through the valve chamber 106.

The accumulator mechanism is generally designated by numeral 114 and it comprises a chamber 116 within which is slidably positioned a compound piston 118 having a first piston portion 120 and a second piston portion 122. The piston portions 120 and 122 partly define separate accumulator chambers within the chamber 116 as indicated at 124 and 126. A spring is positioned in each of the chambers 124 and 126 as indicated at 128 and 130, respectively, for positioning the compound piston 118 at an intermediate position within the chamber 116. Chamber portion 126 continuously communicates with the passages 110 and 112 as indicated and the region between the piston portions 120 and 122 may be open to exhaust to compensate for any change in the effective volume of this region by reason of any differential in the diameters in the piston portions 120 and 122.

When the low-direct shift valve 101 is in the downshifted position shown in FIGURE 2, line pressure may be applied to the release side of the low speed servo through passages 132, 134 and 136. This valve functions in a fashion similar to the shift valve disclosed in the aforementioned Patent No. 2,987,942. Passage 138 communicates with passage 136 and is effective to distribute control pressure to the direct drive rear clutch, generally designated by numeral 39, to cause the same to be energized coincidently with the disengagement of the rear band 92. Immediately after the low direct shift valve assumes an upshifted position, fluid pressure in the direct drive clutch and on the release side of a low speed servo will increase to a value such that the net downward force acting on the compound piston 118 will balance the net force differential caused by springs 128 and 130 and by the control pressure acting on piston portion 122. As the pressure in lines 134, 136 and 138 continues to increase, the compound piston 118 will progressively move in a downward direction until it reaches the limiting position shown in FIGURE 2. After this position is obtained, the clutch actuating pressure and brake servo release pressure will quickly rise to its maximum value. During the time that the compound piston 118 moves in a downward direction, the transmission control member 90 and sun gear 74 accelerate at a progressively increasing rate. At the time the rear clutch is subjected to full control pressure, the relative motion of the clutch discs is zero.

If the torque demands of the transmission are increased, the control pressure will be of a relatively high magnitude. Also, the torque requirements of the clutch are proportionately higher and the clutch and brake servo release pressure must therefore increase to a higher value before the piston 118 begins to move in a downward direction. The progressive variation in pressure provided by the accumulator will therefore take place at a higher pressure range. However, the rate of pressure buildup during the shift interval will remain constant regardless of the absolute values of the pressures at the starting and end points. The clutch will be engaged and the brake will be released in a timed, smooth and continuous fashion regardless of the magnitude of the torque.

During a downshift from direct drive to low speed operation, the release side of the low speed servo and the direct drive clutch are exhausted through passages 132, 134, 136 and 138 and through the low-direct shift valve as the latter assumes a downshift position. It will be apparent that the accumulator mechanism will cushion the engagement of the brake band 92 and the disengagement of the direct drive clutch since the compound piston is effective to maintain a progressively decreasing residual pressure in the direct drive clutch and on the release side of the low speed servo. It is desirable to provide a longer shift interval when the transmission is downshifted from direct drive to low speed operation under closed throttle driving conditions, such as during coast downshift. For this reason a coast downshift control valve is provided, as shown at 140 and it is comprised of a valve spool subjected to throttle pressure on one side thereof and to an opposed spring pressure. Under closed throttle conditions the spring pressure acting on the valve spool of the coast downshift control valve will assume a right-hand position as viewed in FIGURE 2 thereby introducing an added restriction 142 into the line 134 thus delaying the application of the low speed brake band 92. However, during a forced downshift from direct drive to low speed operation, the throttle pressure is sufficiently high to cause the valve spool of the coast downshift control valve 140 to assume a left hand position thereby accommodating free fluid communication between the passages 132 and 134.

In addition to the valve 140 we have provided a forced downshift control valve 144 which comprises a valve spool adapted to be subjected to governor pressure on one side thereof and to an opposing spring pressure during a downshift. At high vehicle speeds, the governor pressure is of sufficient magnitude to urge the valve spool of the control valve 140 in a left hand direction as viewed in FIGURE 2 thereby introducing a restriction 146 into passage 134. During a forced downshift at relatively low vehicle speeds the restriction 146 is bypassed as the valve spool for the forced downshift control valve 144 assumes a right hand position. This permits free communication between the passages 134 and 136. During an upshift the fluid pressure is bypassed around the restriction 146 through a ball check valve controlled bypass opening 148, a suitable check valve 150 being provided for the purpose.

What we claim and desire to secure by United States Letters Patent is:

1. In an automatic power transmission mechanism having a power input driving portion, a power output driven portion, and a plurality of gear elements interconnecting said driving and driven portions; a gear control means for regulating relative movement between said gear elements to accommodate a delivery of torque therethrough at various torque ratios, said gear control means including a double acting fluid pressure responsive servo adapted to actuate the same, said servo having a servo pressure release chamber and a servo pressure apply chamber, a fluid pressure source, a control valve circuit including a separate fluid pressure passage interconnecting said fluid pressure source and each of said servo chambers, and an accumulator comprising a fluid chamber, a movable member situated in said chamber defining separate accumulator portions on either side thereof, a first branch passage connecting one accumulator portion with said pressure source to provide direct and continuous fluid communication therebetween and a second branch passage connecting continuously the other accumulator portion with one pressure chamber of said servo, and valve means disposed in and partly defining said second branch passage for distributing pressure selectively to said one pressure chamber.

2. In an automatic power transmission mechanism having a power input driving portion, a power output driven portion and a plurality of cooperating gear elements interconnecting said driving and driven portions; a gear control means including separate portions for individually regulating the motion of separate ones of said gear elements to accommodate a delivery of torque therethrough at various gear ratios, said gear control means including a first fluid pressure responsive servo adapted to actuate a first portion of said gear control means to effect a first gear ratio and a second servo adapted to actuate a second portion of said gear control means to effect a second gear ratio, said second servo including a double acting piston defining a pair of opposed working chambers, a fluid pressure source, a control valve circuit including a fluid pressure passage having separate portions extending from said fluid pressure source to said first servo and to one of the working chambers of said second servo respectively, valve means disposed in and partly defining said passage for distributing a common pressure selectively and simultaneously to said separate portions, another portion of said passage extending from said fluid pressure source to the other working chamber of said second servo, and an accumulator comprising a fluid chamber, a movable wall disposed in said fluid chamber defining in part a pair of opposed pressure chambers, one of said pressure chambers communicating with said other passage portion and the other pressure chamber communicating with said separate passage portions.

3. The combination as set forth in claim 2 wherein said movable member comprises a piston and spring means acting on said piston for biasing the same in opposition to the fluid pressure forces established by the pressures in said pressure chambers.

4. In an automatic power transmission mechanism having a power input driving member, a power output driven member, and a plurality of gear elements drivably coupling said driving and driven members; separate means for controlling the motion of individual ones of said gear elements including pressure responsive servos, a fluid pressure source, a fluid pressure passage communicating with said fluid pressure source including separate branch portions, each of said servos including a movable piston adapted to actuate a movable portion of its associated motion controlling means, a piston for one of said servos defining in part a first fluid working chamber, the piston for the other servo being double acting and defining in part a pair of opposed working chambers on either side thereof, one of said branch passage portions communicating with one of said opposed working chambers, the other of said branch passage portions communicating with said first working chamber, an accumulator comprising a fluid chamber, and a movable member disposed in said fluid chamber and separating the same into two opposed accumulator fluid chambers, the other of said opposed working chambers and one of said accumulator fluid chambers communicating continuously with said pressure source, the other accumulator fluid chamber and the other opposed working chamber communicating with said other branch passage portion, and valve means forming a part of said passage for selectively distributing pressure from said source to said other branch passage portion.

5. In a control valve circuit for distributing and regulating control pressure for each of two pressure responsive actuator mechanisms, one of said actuator mechanisms comprising a double acting piston partly defining a pair of opposed fluid working chambers and the other of said actuator mechanisms comprising another piston partly defining another fluid working chamber, a fluid circuit including a valve mechanism for distributing fluid pressure to each of said actuator mechanisms, said circuit including a fluid pressure source, a pressure passage communicating with said pressure source and including separate branch portions extending to each of said actuator mechanisms, one branch portion extending to one of said opposed working chambers and the other branch portion extending to said other working chamber, the other of said opposed working chambers communicating continuously with said pressure source to cause said one actuator mechanism to be normally energized when the other of said opposed working chambers is exhausted, said one actuator being de-energized and said other actuator being energized when said passage is pressurized, an accumulator comprising a pressure chamber, a movable member positioned in said pressure chamber defining a pair of opposed accumulator chambers, one of said accumulator chambers communicating directly with said pressure source, and means for pressurizing the other accumulator chamber with the fluid pressure existing in said pressure passage, the rate of pressure build-up being smooth, continuous and independent of the pressure level of said pressure source.

6. In a fluid pressure operated mechanism including a servo motor, said motor including a pair of opposed fluid working chambers, a fluid pressure source, conduit structure interconnecting said pressure source and said motor including separate branch portions extending to each of said opposed working chambers, an accumulator chamber, a movable member situated in said accumulator chamber and defining a pair of opposed accumulator chamber portions, one of said accumulator chamber portions communicating with one branch portion of said conduit structure and the other accumulator chamber portion communicating with the other branch portion of said conduit structure, and valve means located in and partly defining one branch portion for controlling distribution of fluid pressure from said source to one opposed chamber, the other branch portion providing continuous pressure distribution to the other opposed chamber.

7. In a fluid pressure operated mechanism including a servo motor, said motor comprising a pair of opposed working chambers, a fluid pressure source, conduit structure interconnecting said pressure source and said motor including separate branch portions extending to each of said opposed working chambers, a double acting accumulator including two cylinders, piston means including separate portions disposed in each cylinder to define a pair of opposed accumulator chambers, one branch portion of said conduit structure communicating with one accumulator chamber and the other branch portion communicating with the other accumulator chamber, and valve means located in and partly defining one branch portion for controlling distribution of fluid pressure from said source to one opposed chamber, the other branch portion providing continuous pressure distribution to the other opposed chambers.

8. In an automatic, multiple speed power transmission including power transmitting gear elements and control means including two fluid pressure operated servos for controlling the motion of said gear elements to effect a variation in the torque multiplying ratio thereof; a control valve circuit for distributing fluid pressure to said control means including a fluid pressure source, conduit structure interconnecting said pressure source with said control means including separate branch portions extending to each servo, means for independently pressurizing said branch portions to actuate and de-actuate said control means accordingly, a pressure accumulator comprising dual accumulator chambers, a bipartite movable member with a separate part thereof movably disposed in each accumulator chamber, a separate one of the branch portions of said conduit structure communicating with each accumulator chamber.

9. The combination as set forth in claim 8 wherein said accumulator includes spring means for urging said movable member in opposition to the fluid pressure forces created by the fluid pressures in said accumulator chambers.

10. In a fluid pressure operated mechanism comprising a double acting servo having a fluid pressure movable member with opposed fluid working chambers situated on opposed sides thereof, a fluid pressure source, conduit structure communicating with said pressure source including separate branch portions extending to each of said working chambers, the working area on one side of said movable member being greater than the working area on the opposite side thereof, said movable member assuming an inoperative position when both of said working chambers are pressurized and assuming an operative position when the larger of said working chambers is exhausted, a pair of accumulator chambers, a bipartite movable element having a separate part thereof disposed in each accumulator chamber, the branch portion of said conduit structure communicating with the smaller of said working chambers extending to said accumulator at one side of said movable element and the branch portion of said conduit structure communicating with the larger of said working chambers extending to said accumulator at the other side of said movable element, and valve means located in and defining in part said last-named branch portion for selectively distributing pressure thereto from said source, the pressure in said last-named branch portion increasing during a transient period from a low value to an ultimate high value, the first-named branch portion being continuously pressurized by said source with a pressure corresponding in magnitude to said ultimate value.

11. A control means for controlling the motion of the gear elements of an automatic, multiple speed, power transmission for transmitting power from an engine to a driven member, said control means comprising a first fluid pressure operated servo having a double acting piston, the effective working surface on opposed sides of said piston having dissimilar areas, a second fluid pressure operated servo, a fluid pressure source, conduit structure including portions extending from said pressure source to said second servo and to each side of the double acting piston of said first servo, an accumulator comprising a fluid chamber, a movable member disposed in said accumulator chamber, the portion of said conduit structure communicating with said second servo and with said first servo on one side of said double acting piston extending to said accumulator on one side of said movable member, said first servo being de-energized and said second servo being energized when said last-mentioned portion of said conduit structure is pressurized by said pressure source, and valve means disposed in and partly defining said last-mentioned portion of said conduit structure for distributing pressure thereto from said source, the pressure in said last-mentioned portion of said conduit structure varying during a transient period from a low value to an ultimate high value upon actuation of said valve means, the other side of said double acting piston being pressurized continuously by said pressure source with a pressure corresponding in magnitude to said ultimate value.

12. In a control means for controlling the motion of the gear elements of a multiple speed, power transmission adapted to transmit power from an engine to a driven member, a double acting fluid pressure operated servo including a movable piston and opposed fluid pressure working chambers partly defined by said piston and disposed on opposite sides thereof, a fluid pressure source, conduit structure interconnecting said pressure source and said servo, and an accumulator comprising a movable member with a separate accumulator chamber situated on either side thereof, one portion of said conduit structure communicating with one accumulator chamber and with the one working chamber of said servo and another portion of said conduit structure interconnecting the other accumulator chamber and the other working chamber of said servo with said pressure source, the effective working area of said other accumulator chamber being less than the effective working area of said one accumulator chamber.

13. The combination as set forth in claim 1 wherein said movable member has formed thereon working surfaces of differential areas, a separate working surface being associated with each accumulator portion, said movable member being biased in one direction to a limiting position under the influence of the pressure in said servo acting on the larger of said surfaces, the accumulator thereby cushioning the pressure response of said servo.

14. The combination as set forth in claim 13 wherein said accumulator includes spring means for normally biasing said movable member against the effective pressure forces of the fluid pressure existing in said accumulator chambers.

15. The combination as set forth in claim 14 wherein said movable member includes separate portions of differential area partly defining said one and said other accumulator chambers respectively, said movable member being urged in said one direction to said limiting position upon build-up in the effective pressure distributed to said servo thereby controlling the rate of pressure response of said servo.

References Cited in the file of this patent

UNITED STATES PATENTS

| | | |
|---|---|---|
| 2,693,260 | Lucia | Nov. 2, 1954 |
| 2,768,503 | Snyder | Oct. 30, 1956 |
| 2,809,536 | O'Malley | Oct. 15, 1957 |
| 3,048,055 | Borman et al. | Aug. 7, 1962 |

OTHER REFERENCES

"Cadillac" Shop Manual for 1956, copy in Div. 12 (Group 340), copyright 1955; pages 12–39.